(12) United States Patent
Kremin et al.

(10) Patent No.: US 12,086,815 B2
(45) Date of Patent: *Sep. 10, 2024

(54) APPROACHES FOR ANALYZING ENTITY RELATIONSHIPS

(71) Applicant: Palantir Technologies Inc., Denver, CO (US)

(72) Inventors: Samuel Kremin, McLean, VA (US); Daniel Chiu, La Jolla, CA (US); Patrick Lii, San Jose, CA (US); Praveen Kumar Ramalingam, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,396

(22) Filed: May 30, 2023

(65) Prior Publication Data
US 2023/0325851 A1    Oct. 12, 2023

Related U.S. Application Data

(63) Continuation of application No. 17/235,905, filed on Apr. 20, 2021, now Pat. No. 11,663,613, which is a
(Continued)

(51) Int. Cl.
*G06Q 30/02* (2023.01)
*G06F 16/901* (2019.01)
(Continued)

(52) U.S. Cl.
CPC ......... *G06Q 30/02* (2013.01); *G06F 16/9024* (2019.01); *H04L 67/306* (2013.01); *G06Q 40/02* (2013.01); *G06Q 50/01* (2013.01)

(58) Field of Classification Search
CPC .............. G06Q 30/02; G06Q 40/02; G06Q 30/0207–30/0277; G06Q 50/01; G06F 16/9024; H04L 67/306
See application file for complete search history.

(56) References Cited

U.S. PATENT DOCUMENTS

| 5,787,253 A | 7/1998 | McCreery |
| 5,978,475 A | 11/1999 | Schneier et al. |

(Continued)

FOREIGN PATENT DOCUMENTS

| CN | 101729531 A | 6/2010 |
| CN | 103281301 A | 9/2013 |

(Continued)

OTHER PUBLICATIONS

FAI Pre-Interview Communication dated Dec. 10, 2019, issued in related U.S. Appl. No. 15/703,895 (4 pages).

(Continued)

*Primary Examiner* — Thuy N Nguyen
(74) *Attorney, Agent, or Firm* — Sheppard Mullin Richter & Hampton LLP (57) ABSTRACT

Systems and methods are provided for obtaining information from at least one computing system, the information including a set of records that respectively identify at least a network-based address of a computing device that accessed the computing system and an account hosted by the computing system that was accessed using the computing device; determining at least a first account and a second account were accessed from one or more computing devices that share a given network-based address based at least in part on the obtained information; and associating the first account and the second account with the network-based address.

20 Claims, 5 Drawing Sheets

Related U.S. Application Data continuation of application No. 15/703,895, filed on Sep. 13, 2017, now Pat. No. 10,984,427.

(51) Int. Cl.
*H04L 67/306* (2022.01)
*G06Q 40/02* (2023.01)
*G06Q 50/00* (2012.01)

(56) References Cited

U.S. PATENT DOCUMENTS

| | | |
|---|---|---|
| 6,253,203 B1 | 6/2001 | O'Flaherty et al. |
| 6,725,240 B1 | 4/2004 | Asad et al. |
| 6,807,569 B1 | 10/2004 | Bhimani et al. |
| 7,017,046 B2 | 3/2006 | Doyle et al. |
| 7,047,415 B2 | 5/2006 | Doyle et al. |
| 7,069,586 B1 | 6/2006 | Winneg et al. |
| 7,225,468 B2 | 5/2007 | Waisman et al. |
| 7,596,285 B2 | 9/2009 | Brown et al. |
| 7,742,946 B2 | 6/2010 | Banks et al. |
| 7,770,032 B2 | 8/2010 | Nesta et al. |
| 7,801,871 B2 | 9/2010 | Gosnell |
| 7,860,934 B1* | 12/2010 | Wolfe ............... G06Q 20/102 709/224 |
| 7,962,495 B2 | 6/2011 | Jain et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,214,899 B2* | 7/2012 | Chien ................ G06F 21/552 726/23 |
| 8,239,668 B1 | 8/2012 | Chen et al. |
| 8,301,904 B1 | 10/2012 | Gryaznov |
| 8,312,546 B2 | 11/2012 | Alme |
| 8,577,998 B2* | 11/2013 | Ver Steeg ............ H04L 63/107 370/254 |
| 8,646,080 B2 | 2/2014 | Williamson et al. |
| 8,683,322 B1 | 3/2014 | Cooper |
| 8,726,379 B1 | 5/2014 | Stiansen et al. |
| 8,769,412 B2 | 7/2014 | Gill et al. |
| 8,782,794 B2 | 7/2014 | Ramcharran |
| 8,931,043 B2 | 1/2015 | Cooper et al. |
| 9,021,260 B1 | 4/2015 | Falk et al. |
| 9,049,117 B1* | 6/2015 | Nucci ................ H04L 43/0811 |
| 9,100,428 B1 | 8/2015 | Visbal |
| 9,148,424 B1* | 9/2015 | Yang .................... H04L 63/083 |
| 9,335,897 B2 | 5/2016 | Goldenberg |
| 9,338,013 B2 | 5/2016 | Castellucci et al. |
| 9,635,391 B1 | 4/2017 | Hardy et al. |
| 9,787,662 B1* | 10/2017 | Nair ..................... G06Q 50/01 |
| 2002/0095339 A1 | 7/2002 | Galloway |
| 2002/0184047 A1 | 12/2002 | Plotnick et al. |
| 2003/0225629 A1 | 12/2003 | Banks et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0157662 A1 | 7/2005 | Bingham et al. |
| 2005/0229256 A2 | 10/2005 | Banzhof |
| 2005/0262556 A1 | 11/2005 | Waisman et al. |
| 2005/0275638 A1 | 12/2005 | Kolmykov-Zotov et al. |
| 2006/0031928 A1 | 2/2006 | Conley et al. |
| 2006/0069912 A1 | 3/2006 | Zheng et al. |
| 2006/0123083 A1* | 6/2006 | Goutte ................ H04L 51/212 709/206 |
| 2006/0179003 A1 | 8/2006 | Steele et al. |
| 2006/0212931 A1 | 9/2006 | Shull et al. |
| 2006/0218637 A1 | 9/2006 | Thomas et al. |
| 2006/0265747 A1 | 11/2006 | Judge |
| 2007/0143851 A1 | 6/2007 | Nicodemus |
| 2007/0294766 A1 | 12/2007 | Mir et al. |
| 2008/0104407 A1 | 5/2008 | Horne et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2008/0285464 A1* | 11/2008 | Katzir ................... H04L 63/20 370/241 |
| 2009/0103442 A1 | 4/2009 | Douville |
| 2009/0228701 A1 | 9/2009 | Lin |
| 2009/0328222 A1 | 12/2009 | Helman et al. |
| 2010/0077481 A1 | 3/2010 | Polyakov et al. |
| 2010/0100963 A1 | 4/2010 | Mahaffey |
| 2010/0146609 A1* | 6/2010 | Bartlett ................ G06Q 20/02 726/7 |
| 2010/0179831 A1 | 7/2010 | Brown et al. |
| 2010/0235915 A1 | 9/2010 | Memon et al. |
| 2010/0262688 A1* | 10/2010 | Hussain ............ H04L 63/1466 709/224 |
| 2010/0330801 A1 | 12/2010 | Rouh |
| 2011/0060910 A1 | 3/2011 | Gormish et al. |
| 2011/0093327 A1* | 4/2011 | Fordyce, III ....... G06Q 30/0224 705/14.66 |
| 2011/0202555 A1 | 8/2011 | Cordover et al. |
| 2011/0219450 A1 | 9/2011 | McDougal et al. |
| 2012/0079592 A1 | 3/2012 | Pandrangi |
| 2012/0084866 A1 | 4/2012 | Stolfo |
| 2012/0102169 A1* | 4/2012 | Yu ..................... H04L 63/1425 709/223 |
| 2012/0110633 A1 | 5/2012 | An et al. |
| 2012/0110674 A1 | 5/2012 | Belani et al. |
| 2012/0169593 A1 | 7/2012 | Mak et al. |
| 2012/0192222 A1 | 7/2012 | Kumar et al. |
| 2012/0209987 A1* | 8/2012 | Rhinelander ......... G06Q 30/02 709/224 |
| 2012/0218305 A1 | 8/2012 | Patterson et al. |
| 2012/0254129 A1 | 10/2012 | Wheeler et al. |
| 2012/0284791 A1 | 11/2012 | Miller et al. |
| 2012/0330801 A1 | 12/2012 | McDougal et al. |
| 2013/0019306 A1 | 1/2013 | Lagar-Cavilla et al. |
| 2013/0067062 A1* | 3/2013 | Gaitonde ................ H04L 43/04 709/224 |
| 2013/0097629 A1 | 4/2013 | Popescu et al. |
| 2013/0097709 A1 | 4/2013 | Basavapatna et al. |
| 2013/0110876 A1 | 5/2013 | Meijer et al. |
| 2013/0139268 A1 | 5/2013 | An et al. |
| 2013/0239217 A1 | 9/2013 | Kindler et al. |
| 2013/0247149 A1* | 9/2013 | Sanft ..................... H04L 63/101 726/4 |
| 2014/0013451 A1 | 1/2014 | Kulka et al. |
| 2014/0059683 A1 | 2/2014 | Ashley |
| 2014/0074863 A1* | 3/2014 | Walkingshaw ......... H04L 65/40 707/748 |
| 2014/0120864 A1* | 5/2014 | Manolarakis ........... H04W 4/23 455/405 |
| 2014/0123279 A1 | 5/2014 | Bishop et al. |
| 2014/0143009 A1 | 5/2014 | Brice et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0258122 A1* | 9/2014 | Wardman ............... G06Q 40/02 705/35 |
| 2014/0283107 A1 | 9/2014 | Walton et al. |
| 2014/0366132 A1 | 12/2014 | Stiansen et al. |
| 2015/0039565 A1 | 2/2015 | Lucas |
| 2015/0040238 A1* | 2/2015 | Sarsa Sarsa ........ H04L 61/2539 726/26 |
| 2015/0051988 A1* | 2/2015 | Chen ................... G06Q 30/0277 705/14.73 |
| 2015/0128274 A1 | 5/2015 | Giokas |
| 2015/0143456 A1* | 5/2015 | Raleigh .................. H04L 63/20 726/1 |
| 2015/0188715 A1 | 7/2015 | Castelluci et al. |
| 2015/0229664 A1 | 8/2015 | Hawthorn et al. |
| 2015/0237388 A1 | 8/2015 | Popescu et al. |
| 2015/0248563 A1 | 9/2015 | Alfarano et al. |
| 2015/0261847 A1 | 9/2015 | Ducott, III et al. |
| 2015/0326601 A1 | 11/2015 | Grondin et al. |
| 2016/0004864 A1 | 1/2016 | Falk et al. |
| 2016/0028759 A1 | 1/2016 | Visbal |
| 2016/0323239 A1* | 11/2016 | Cheng ................. H04L 63/1408 |
| 2016/0323767 A1* | 11/2016 | Abdullah ............. H04W 4/02 |
| 2017/0070523 A1* | 3/2017 | Bailey .................... H04L 63/20 |
| 2017/0078415 A1* | 3/2017 | Wang ................... G06Q 30/02 |
| 2018/0218446 A1* | 8/2018 | Ries ..................... G06Q 40/02 |

(56) References Cited

U.S. PATENT DOCUMENTS

| | | | | |
|---|---|---|---|---|
| 2018/0288066 | A1* | 10/2018 | Brockhuus | H04L 67/306 |
| 2018/0300974 | A1* | 10/2018 | Okubo | H04W 12/71 |
| 2019/0205511 | A1* | 7/2019 | Zhan | H04L 63/1416 |

FOREIGN PATENT DOCUMENTS

| | | |
|---|---|---|
| EP | 1962222 A2 | 8/2008 |
| EP | 2892197 A1 | 7/2015 |
| EP | 2897051 A2 | 7/2015 |
| EP | 2963578 A1 | 1/2016 |
| EP | 2985974 A1 | 2/2016 |
| NL | 2011642 A | 4/2014 |
| WO | 2005010685 A2 | 2/2005 |

OTHER PUBLICATIONS

FAI Office Action dated Feb. 28, 2020, issued in related U.S. Appl. No. 15/703,895 (5 pages).

Final Office Action dated Jun. 10, 2020, issued in related U.S. Appl. No. 15/703,895 (47 pages).

Notice of Allowance mailed Dec. 22, 2020, issued in related U.S. Appl. No. 15/703,895 (12 pages).

Non-Final Office Action dated Oct. 31, 2022, issued in related U.S. Appl. No. 17/235,905 (12 pages).

Notice of Allowance mailed Jan. 20, 2023, issued in related U.S. Appl. No. 17/235,905 (13 pages).

Roberto Diaz, "Cross-Device Tracking: Matching Devices and Cookies", 10.1109/ICDMW.2015.244, 2015.

Diaz, Roberto. (2015). Cross-Device Tracking: Matching Devices and Cookies. 10.1109/ICDMW.2015.244. (Year: 2015).

Baker et al., "The Development of a Common Enumeration of Vulnerabilities and Exposures," Presented at the Second International Workshop on Recent Advancesin Intrusion Detection, Sep. 7-9, 1999, pp. 35.

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

Virus Total—About, <http://www.virustotal.com/en/about/> Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_505-9_parc.pdf.

Zheng et al., "GOEAST: a web-based software toolkit for Gene Ontology enrichment analysis," Nucleic acids research 36.suppl 2 (2008): pp. W385-W363.

\* cited by examiner

Account Analysis Report

| IP Address | Geolocation | Related Accounts | Access Date/Periods |
|---|---|---|---|
| 192.168.1.1 | San Francisco, CA | Email Account: exampleuser@example.com,<br>Bank Account: testuser, Bank, Account #######,<br>Social Networking Account: testuser, Example Social Network | January 29, 2017 |
| ⋮ | ⋮ | ⋮ | ⋮ |

Obtain information from at least one computing system, the information including a set of records that respectively identify at least a network-based address of a computing device that accessed the computing system and an account hosted by the computing system that was accessed using the computing device
402

Determine at least a first account and a second account were accessed from one or more computing devices that share a given network-based address based at least in part on the obtained information
404

Associate the first account and the second account with the network-based address
406

APPROACHES FOR ANALYZING ENTITY RELATIONSHIPS

CROSS REFERENCE TO RELATED APPLICATIONS

This application is a continuation of U.S. patent application Ser. No. 17/235,905, filed Apr. 20, 2021, which is a continuation of U.S. patent application Ser. No. 15/703,895, now U.S. Pat. No. 10,984,427 B1, filed Sep. 13, 2017, the content of which is incorporated by reference in its entirety into the present disclosure.

FIELD OF THE INVENTION

This disclosure relates to approaches for analyzing entity relationships.

BACKGROUND

Under conventional approaches, various types of data can be stored and represented using an object model. An object graph created based on the object model may be made up of a number of objects that serve as containers for data. Each object can include a number of object components.

SUMMARY

Various embodiments of the present disclosure can include systems, methods, and non-transitory computer readable media configured to obtain information from at least one computing system, the information including a set of records that respectively identify at least a network-based address of a computing device that accessed the computing system and an account hosted by the computing system that was accessed using the computing device; determine at least a first account and a second account were accessed from one or more computing devices that share a given network-based address based at least in part on the obtained information; and associate the first account and the second account with the network-based address.

In some embodiments, the systems, methods, and non-transitory computer readable media are configured to determine that the first account and the second account were accessed within a specified timeframe.

In some embodiments, the systems, methods, and non-transitory computer readable media are configured to determine at least one record that corresponds to a blacklisted network-based address; and give the user an option to remove the at least one record and network-based address from the information.

In some embodiments, the systems, methods, and non-transitory computer readable media are configured to export data corresponding to the network-based address to a data analysis tool for further evaluation.

In some embodiments, the systems, methods, and non-transitory computer readable media are configured to determine at least one object in an object graph that corresponds to the network-based address, the object graph being managed by the data analysis tool; and merge at least some of the data corresponding to the network-based address with the object corresponding to the network-based address.

In some embodiments, the systems, methods, and non-transitory computer readable media are configured to provide an interface through which the association between the first account and the second account is presented.

In some embodiments, the systems, methods, and non-transitory computer readable media are configured to enrich at least one record in the information to include additional information.

In some embodiments, the systems, methods, and non-transitory computer readable media are configured to identify a first record in the information; determine that a network-based address included in the first record is blacklisted; and associate the first record with information that indicates the network-based address is blacklisted.

In some embodiments, the systems, methods, and non-transitory computer readable media are configured to identify a first record in the information; determine geolocation information associated with a network-based address included in the first record; and associate the geolocation information with the first record.

In some embodiments, the systems, methods, and non-transitory computer readable media are configured to obtain a set of financial reports from at least one computing system, each financial report specifying one or more network-based addresses used to access one or more financial accounts; and determine at least a pair of financial accounts that were accessed by one or more computing devices that share a given network-based address.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Vast amounts of data may need to be evaluated when identifying relationships between entities. Under conventional approaches, an analyst tasked with identifying relationships between entities can utilize spreadsheet software to import data to be evaluated. The imported data may be obtained from various different sources. To ensure accurate review, the analyst may need to manually organize the imported data into a standardized format. The analyst can then look for patterns or relationships within the imported data. Such conventional approaches, however, are prone to error and thus may not be sufficient to fully determine relationships between entities.

A claimed solution rooted in computer technology overcomes problems specifically arising in the realm of computer technology. In various embodiments, a system can be configured to process and analyze data for purposes of identifying relationships between login-based accounts (e.g., user accounts such as email accounts, social networking accounts, bank accounts, etc.). In some embodiments, the system can ingest account access information (e.g., log data) obtained from various computing systems (e.g., online service providers). For example, log data obtained from a computing system may include a number of log lines that each identify a network-based address (e.g., Internet Protocol address) of some computing device that accessed the computing system, what was accessed (e.g., an email account), and when the access occurred. Once ingested, the system can standardize the log data so that it can be compared with log data obtained from other computing systems.

In some embodiments, the system can enrich log data using extrinsic information. For example, the log data may be enriched to include respective geolocation information for network-based addresses included in the log data. In another example, the log data may be enriched to indicate whether respective network-based addresses included in the log data have been whitelisted for processing. Based on this information, the system can identify any network-based addresses that were used to access multiple accounts through any of the computing systems (e.g., online service providers). In some embodiments, accounts accessed from computing devices that were assigned the same network-based address can be identified as being related and, optionally, may be flagged for further review. For example, the system can determine that one or more computing devices assigned the IP address 192.168.1.1 accessed both an email account accessible through a first online service provider and a bank account accessible through a second online service provider. In this example, the email account and the bank account may be associated (or linked) since the same IP address was used to access both accounts.

In some embodiments, the system can be configured to ingest other types of information in which network-based access information is provided. For example, the system can ingest financial reports that specify relevant IP addresses as header data. In some embodiments, such ingested data can be exported to an external data analysis tool for further processing. For example, the data analysis tool can be configured to supplement the ingested information with data uncovered from separate investigations. In some embodiments, the data analysis tool can supplement the ingested information using an object model. For example, the data analysis tool can identify an object associated with some network-based address that is of interest. In this example, the data analysis tool can merge (or incorporate) the network-based address including some, or all, log data associated with the network-based address with the identified object.

Figure 1:
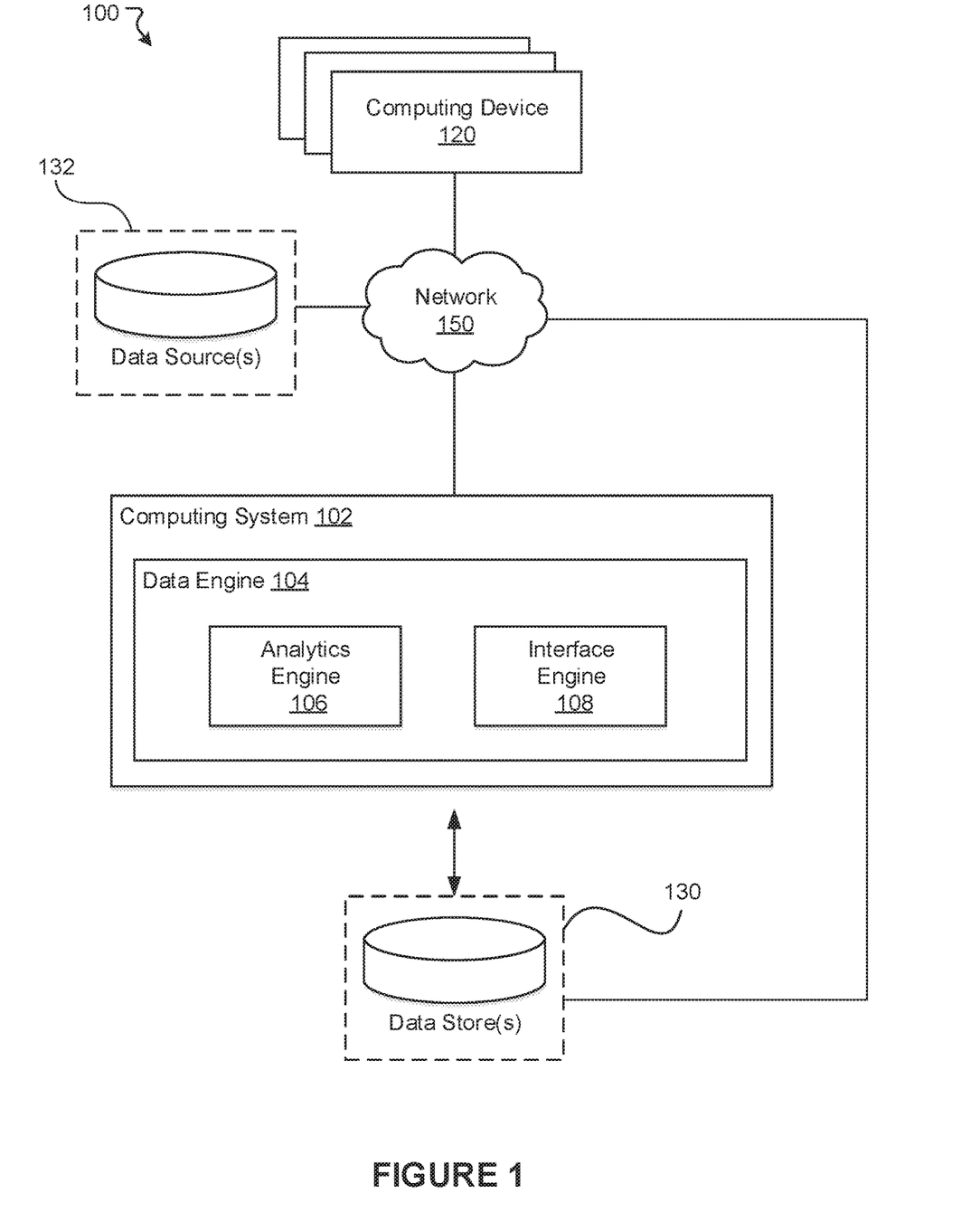
FIG. 1 illustrates an example computing environment, in accordance with various embodiments.

FIG. 1 illustrates an example environment 100, in accordance with various embodiments. The example environment 100 can include at least one computing system 102 that includes one or more processors and memory. The processors can be configured to perform various operations by interpreting machine-readable instructions. In some embodiments, the example environment 100 may be implemented as an enterprise data platform. In some embodiments, the example environment 100 may be configured to interact with computing systems of an enterprise data platform. In various embodiments, computing systems of the enterprise data platform may store and manage various data as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. In some embodiments, data corresponding to populated object graphs is stored and accessible through one or more data stores 130.

In some embodiments, the computing system 102 can include a data engine 104. The data engine 104 can include an analytics engine 106 and an interface engine 108. The data engine 104 can be executed by the processor(s) of the computing system 102 to perform various operations including those operations described in reference to the analytics engine 106 and the interface engine 108. In general, the data engine 104 can be implemented, in whole or in part, as software that is capable of running on one or more computing devices or systems. In one example, the data engine 104 may be implemented as or within a software application running on one or more computing devices (e.g., user or client devices) and/or one or more servers (e.g., network servers or cloud servers). In some instances, various aspects of the data engine 104, the analytics engine 106, and the interface engine 108 may be implemented in one or more computing systems and/or devices. The environment 100 may also include one or more data stores 130 accessible to the computing system 102. In general, a data store may be any device in which data can be stored and from which data can be retrieved. The data stores 130 may be accessible to the computing system 102 either directly or over a network 150. In some embodiments, the data stores 130 can store data that can be accessed by the data engine 104 to provide the various features described herein. For example, as mentioned, the data stores 130 can store object graph data in which information describing objects is stored and accessible. Further, the environment 100 may include one or more data sources 132 accessible to the computing system 102. In general, a data source may be any device in which data can be stored and from which data can be retrieved. In some embodiments, these data sources 132 can store account access information for various computing systems (e.g., online service providers, account providers, etc.). For example, the data sources 132 may store access logs for a computing system. An access log of a computing system may include a number of log lines (or records) that each identify a network-based address (e.g., Internet Protocol address) of some computing device that accessed the computing system, what was accessed (e.g., an email account, a social networking account, etc.), and when the access occurred (e.g., a timestamp), for example. Similarly, the data sources 132 may be accessible to the computing system 102 either directly or over the network 150. The network 150 may be any wired or wireless network through which data can be sent and received (e.g., the Internet, local area network, etc.).

The analytics engine 106 can be configured to process and analyze data for purposes of identifying relationships between various entities. In some embodiments, these entities correspond to login-based user accounts (e.g., email accounts, bank accounts, etc.). In various embodiments, the analytics engine 106 can ingest (or import) account access information (e.g., access logs) from various computing systems (e.g., online service providers). The analytics engine 106 can process the account access information to identify any network-based addresses that were used to access accounts through any of the computing systems. In some embodiments, user accounts accessed from a computing device that was assigned the same network-based address can be identified as being related and, optionally, may be flagged for further review. For example, the system can determine that a computing device assigned the IP address 192.168.1.1 accessed both an email account accessible through a first online service provider and a bank account accessible through a second online service provider. In this example, the email account and the bank account may be associated (or linked) with the IP address. More details describing the analytics engine 106 will be provided below in reference to FIG. 2.

Figure 3:
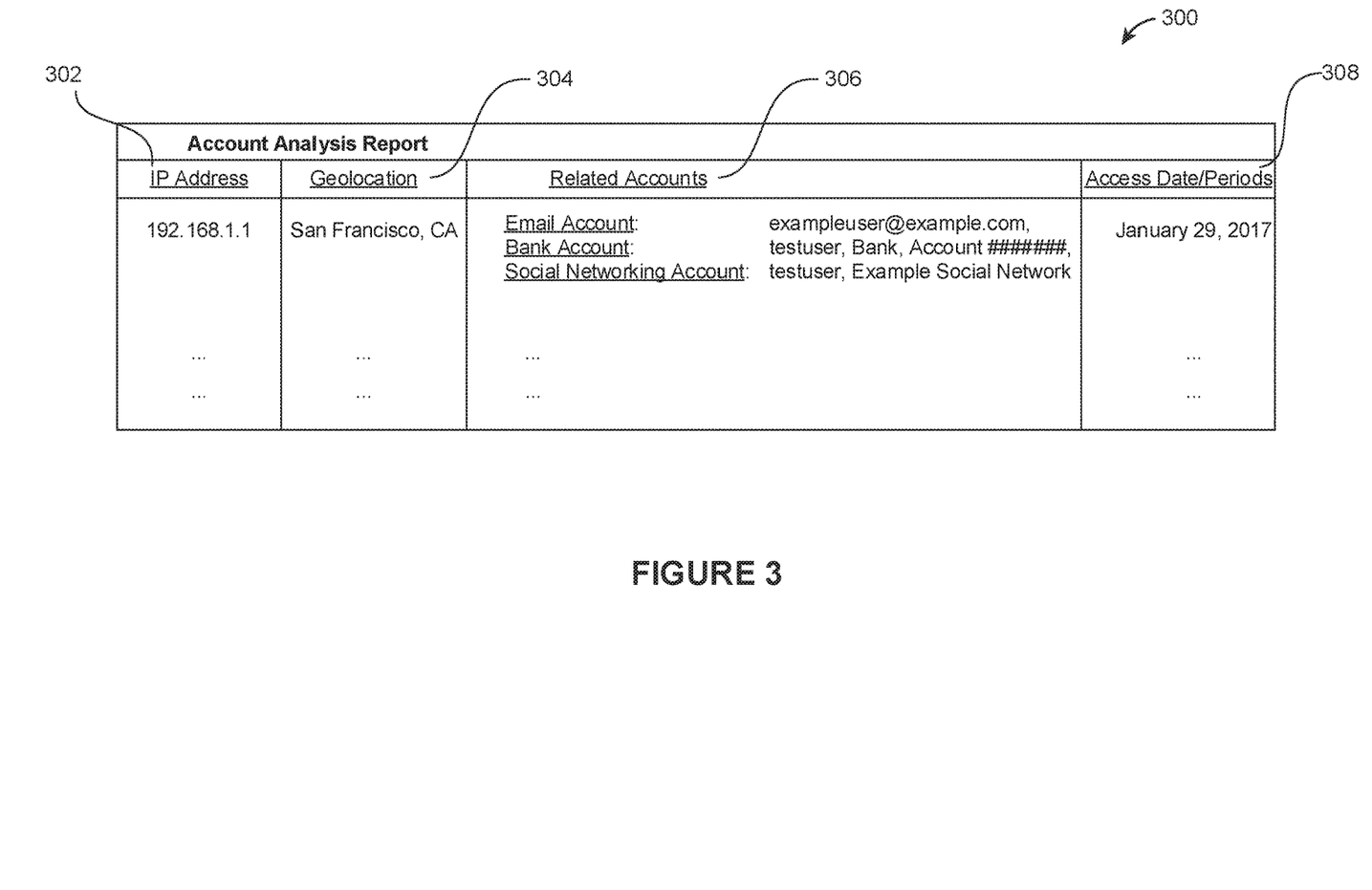
FIG. 3 illustrates an example diagram, in accordance with various embodiments.

The interface engine 108 can be configured to generate and provide an interface (e.g., graphical user interface) through which various information can be accessed and visualized. For example, the interface can be provided by a software application (e.g., data analytics application, web browser, etc.) running on a computing device 120 and through a display screen of the computing device 120. The interface can provide users with the ability to access information describing entity relationships as determined by the analytics engine 106. For example, a user operating the computing device 120 can interact with the interface to access reports generated by the analytics engine 106 as illustrated in the example of FIG. 3.

Figure 2:
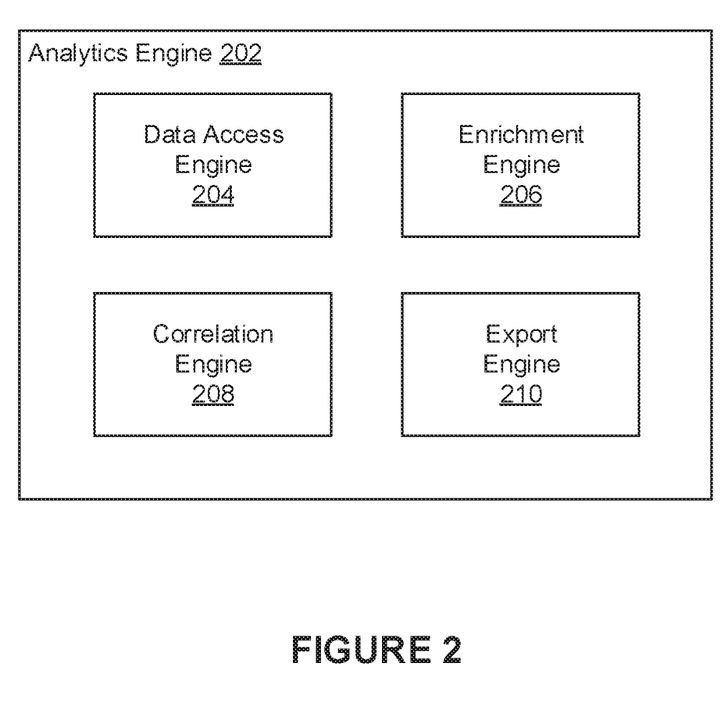
FIG. 2 illustrates an example analytics engine, in accordance with various embodiments.

FIG. 2 illustrates an example analytics engine 202, in accordance with various embodiments. The analytics engine 202 may be implemented as the analytics engine 106 of FIG. 1. In some embodiments, the analytics engine 202 includes a data access engine 204, an enrichment engine 206, a correlation engine 208, and an export engine 210.

The data access engine 204 can be configured to obtain account access information corresponding to various computing systems (e.g., online service providers). Such account access information may be provided in the form of access logs, spreadsheets, and/or comma separated values (CSV) files, to name some examples. In general, account access information corresponding to a given computing system can identify and describe incoming network-based connections to the computing system by various computing devices (e.g., computers, laptops, smartphones, tablets, etc.). In some embodiments, the account access information includes a number of records (or log lines) that each provide information about a network-based connection that originated from a computing device and was used to access the computing system. Such information can include, for example, a network-based address (e.g., Internet Protocol address) assigned to the computing device, what the computing device accessed (e.g., an account username or identifier), and when the access occurred (e.g., a timestamp).

In some embodiments, the data access engine 204 can format (or organize) the account access information obtained from the various computing systems. For example, the data access engine 204 can standardize all of the account access information so that account access information obtained from one computing system can be compared and evaluated against account access information obtained from a different computing system. In one example, the data access engine 204 can format the account access information so that values (e.g., network-based address, name or identifier of an account that was accessed, timestamp, etc.) associated with each record (or log line) correspond to a pre-determined order. For example, the account access information can be formatted so that each record (or log line) identifies a corresponding network-based address, followed by a name or identifier of an account that was accessed by a computing device assigned the network-based address, followed by a timestamp of when the access occurred. Many variations are possible.

The enrichment engine 206 can be configured to enrich the account access information using extrinsic information. For example, the enrichment engine 206 can enrich each record (or log line) included in the account access information. Such enrichment can provide additional context for the network-based address corresponding to the record.

In some embodiments, the enrichment engine 206 can enrich records (or log lines) in the account access information to include respective geolocation information. For example, the enrichment engine 206 can evaluate corresponding network-based addresses for each record included in the account access information. For each network-based address, the enrichment engine 206 can determine geolocation information that identifies a geographic region (or location) to which the network-based address corresponds. Such geolocation information may be obtained using generally known approaches including, for example, IP address databases and/or IP geolocation services.

In some embodiments, the enrichment engine 206 can enrich each record (or log line) in the account access information to identify a respective Internet service provider (ISP) that assigned a network-based address associated with the record. For example, the enrichment engine 206 can determine that an IP address 192.168.1.1 was assigned to a computing device by Internet Service Provider ABC. The enrichment engine 206 can then associate the name of this ISP with the record corresponding to the IP address. In general, such ISP information may be obtained using well-known approaches.

In some embodiments, the enrichment engine 206 can enrich each record (or log line) in the account access information to include information indicating whether a network-based address corresponding to the record has been whitelisted. For example, network-based addresses may be whitelisted (or blacklisted) depending on geographic regions (or locations) to which those network-based addresses correspond. In another example, network-based addresses may be whitelisted (or blacklisted) depending on the type of data (or traffic) that is communicated from computing devices assigned those network-based addresses. In some embodiments, only whitelisted network-based addresses are evaluated by the correlation engine 208.

The correlation engine 208 can be configured to analyze the enriched account access information. In some embodiments, the correlation engine 208 can identify any network-based addresses used to access multiple accounts through any of the various computing systems (or online service providers). For example, the correlation engine 208 can determine that a computing device assigned the IP address 192.168.0.31 accessed an email account through a first online service provider, a bank account through a second online service provider, and a social networking account through a third online service provider. In this example, the email account provided by the first online service provider, the bank account provided by the second online service provider, and the social networking account provided by the third online service provider can be associated (or linked) with the IP address 192.168.0.31 that was used to access all three accounts. In some embodiments, accounts accessed from the same network-based address can be identified as being related and, optionally, may be flagged for further review.

In some embodiments, the correlation engine 208 can identify any network-based addresses used to access multiple accounts through any of the various computing systems (or online service providers) within a specified time period. For example, the correlation engine 208 can determine that a computing device assigned the IP address 192.168.1.152 accessed an email account through a first online service provider on Jan. 29, 2017 and a bank account through a second online service provider on Jan. 30, 2017. The correlation engine 208 can also determine that a computing device assigned the IP address 192.168.0.11 accessed an email account through the first online service provider on Jan. 30, 2017 and a social networking account through the third online service provider on Aug. 15, 2017. In this example, assuming the specified time period corresponds to the month of January 2017, the correlation engine 208 can identify the IP address 192.168.1.152 as a network-based address that was used to access multiple accounts (e.g., the email account and the bank account) within the specified time period (e.g., January 2017). In contrast, the correlation engine 208 will not identify the IP address 192.168.0.11 as a network-based address that was used to access multiple accounts since this IP address only accessed one account (e.g., the email account) within the specified time period.

In some embodiments, the correlation engine 208 can obtain and analyze other types of information to identify accounts related to a given network-based address. For example, in some embodiments, the correlation engine 208 can analyze financial reports that identify one or more online financial accounts and network-based addresses of computing devices that were used to access those financial accounts. The correlation engine 208 can match network-based addresses identified in these financial reports with network-based addresses identified in the account access information described above. For example, the correlation engine 208 can determine that some computing device assigned the IP address 192.168.0.31 accessed an email account provided by a first online service provider, a bank account provided by a second online service provider, and a social networking account provided by a third online service provider based on the account access information. The correlation engine 208 can also determine that the IP address 192.168.0.31 was also used to access a financial account identified in a financial report. In this example, the financial account identified in financial report, the email account, the bank account, and the social networking account can all be associated (or linked) with the IP address 192.168.0.31. In some embodiments, the correlation engine 208 can output information describing relationships between network-based addresses and accounts associated with those network-based addresses in one or more reports, as illustrated in the example of FIG. 3.

The export engine 210 can be configured to export information describing network-based addresses and corresponding accounts identified as being related to (or associated with) those network-based addresses. In some embodiments, such information can be exported to an external data analysis tool for further processing. For example, the data analysis tool can be configured to supplement the exported information with data uncovered from separate investigations. In some embodiments, the data analysis tool can merge the exported information with corresponding objects in an object graph. For example, the data analysis tool can determine a network-based address that was used to access multiple accounts from the exported information. The data analysis tool can also determine an object in an object graph that corresponds to the network-based address. In this example, the data analysis tool can associate (or merge) any account information related to the network-based address, as determined from the exported information, with the object corresponding to the network-based address.

FIG. 3 illustrates a diagram of an example report 300. The example report 300 may be generated using the approaches described above, for example. In some embodiments, the report 300 identifies network-based addresses 302, respective geolocation information 304 corresponding to the network-based addresses, respective account information 306 for accounts identified as being associated with the network-based addresses, and respective time periods 308 over which those accounts were accessed. Many variations are possible. In the example of FIG. 3, the report 300 identifies an IP address 192.168.1.1 that is associated with San Francisco, CA. The report 300 also indicates that this IP address was used to access an email account, a bank account, and a social networking account on Jan. 29, 2017.

Figure 4:
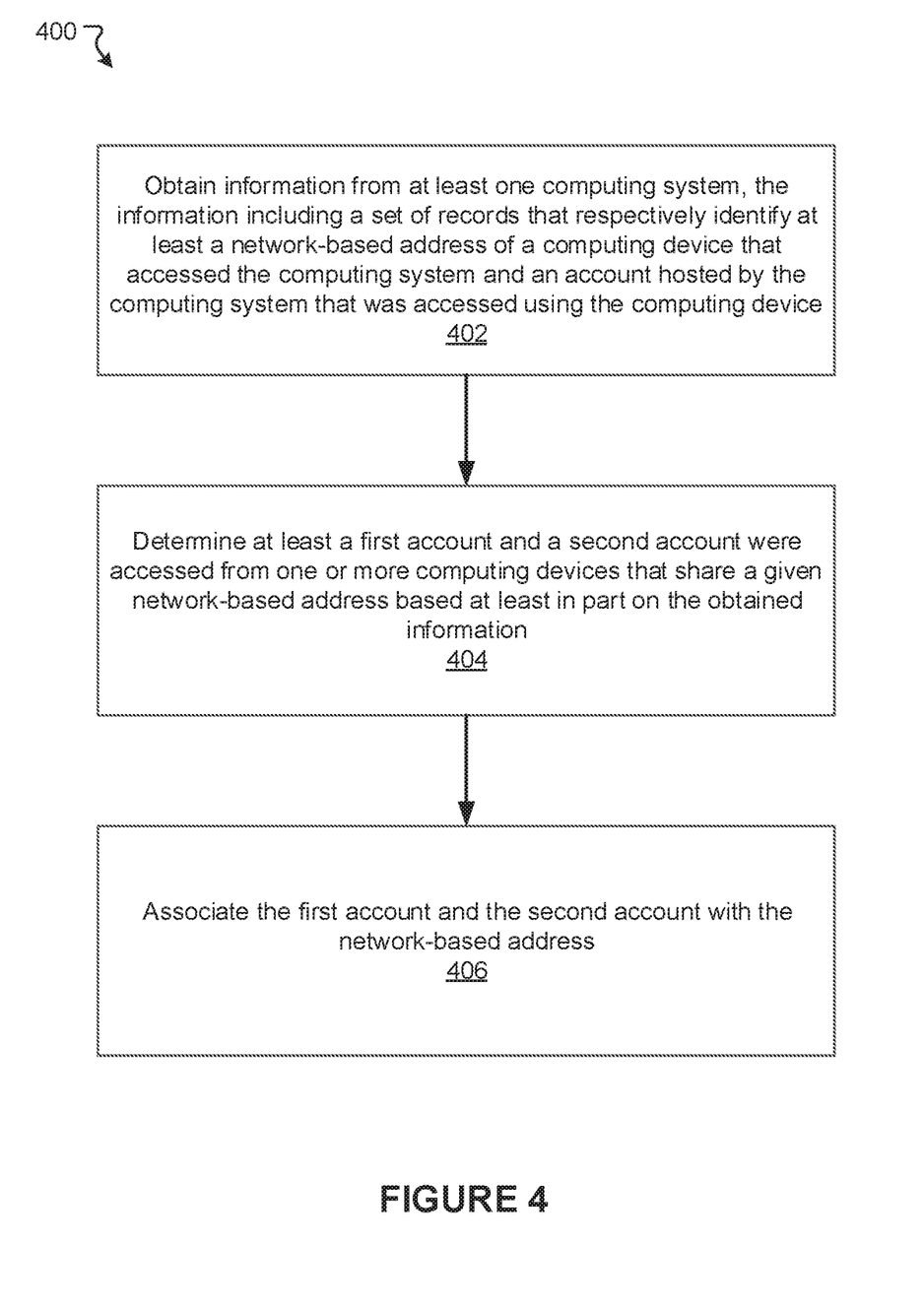
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, information from at least one computing system is obtained. The information can include a set of records that respectively identify at least a network-based address of a computing device that accessed the computing system and an account hosted by the computing system that was accessed using the computing device. At block 404, a determination is made that at least a first account and a second account were accessed from one or more computing devices that share a given network-based address based at least in part on the obtained information. At block 406, an association is made between the first account and the second account with the network-based address.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
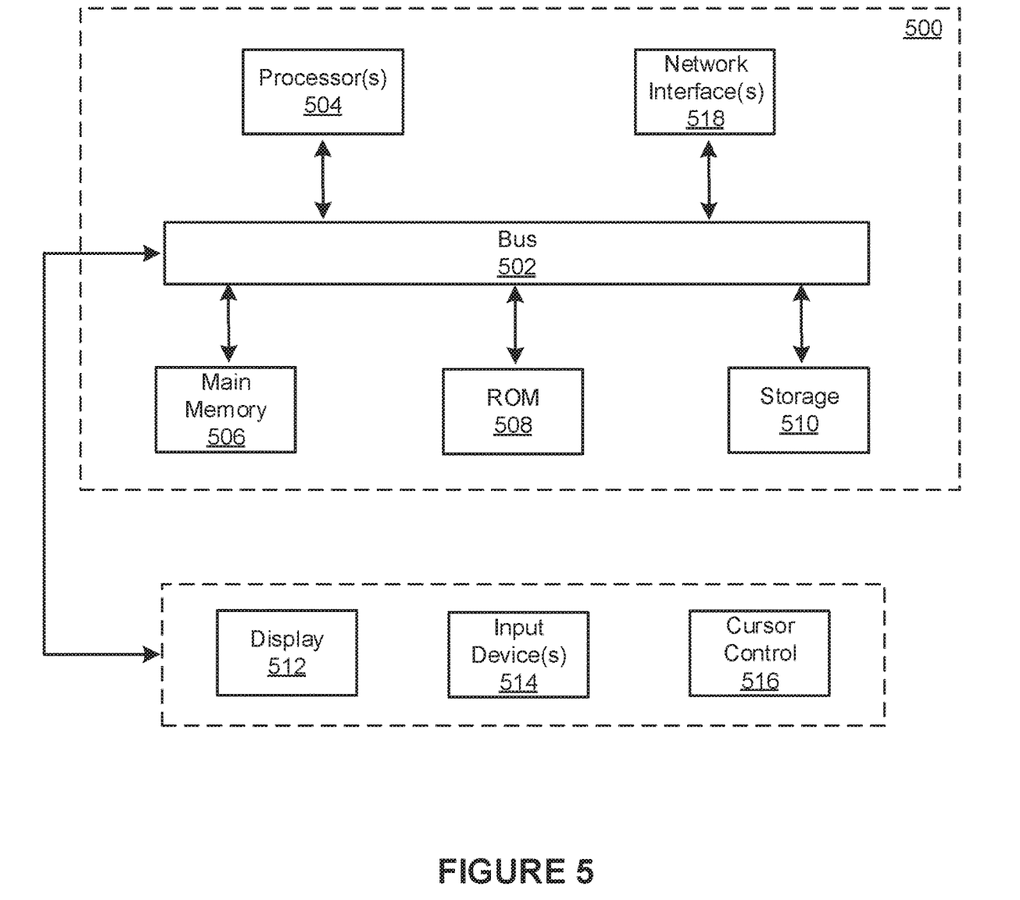
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system." "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
obtaining log data from at least one computing system, the log data including one or more records that identify one or more Internet Protocol (IP) addresses of one or more computing devices that accessed the at least one computing system and one or more accounts hosted by the at least one computing system that were accessed by the computing devices and one or more timestamps indicating respective times of access of the IP addresses;
determining, based at least in part on the obtained log data, that at least a first account was accessed from a computing device of the computing devices with an IP address of the IP addresses, and a time at which the first account was accessed based on the timestamps;
determining whether the IP address has been permitted based on geolocation log data corresponding to the IP address or based on a type of traffic from one or more particular computing devices assigned to the IP address;
in response to the IP address being permitted:
receiving an indication that a second account was accessed using the IP address;
and flagging the first account and the second account based on the respective times that the first account and the second account were accessed.

2. The system of claim 1, wherein the flagging further comprises:
flagging the first account, the second account, and a third account in response to determining that the first account, the second account, and the third account were accessed by the computing device within a specified timeframe.

3. The system of claim 1, wherein the instructions further cause the system to perform:
determining at least one record in the records that corresponds to a blocked IP address; and
removing the at least one record from the records.

4. The system of claim 1, wherein the instructions further cause the system to perform:
exporting data corresponding to the IP address to a data analysis tool for further evaluation.

5. The system of claim 4, wherein the instructions further cause the system to perform:
determining at least one object in an object model that corresponds to the IP address, the object model being managed by the data analysis tool.

6. The system of claim 1, wherein the instructions further cause the system to perform:
 providing an interface through which a link between the first account and the second account is presented.

7. The system of claim 1, wherein the instructions further cause the system to perform identifying that a particular IP addresses accessed two different accounts of two different account types.

8. The system of claim 1, wherein the instructions further cause the system to perform:
 identifying a first record in the records;
 determining that the IP address associated with the first record is blocked; and
 associating the first record with information that indicates the IP address is blocked.

9. The system of claim 1, wherein the instructions further cause the system to perform:
 enriching the more or more records, the enriching comprising:
 identifying a first record in the records;
 determining geolocation log data associated with the IP address associated with the first record; and
 associating the geolocation log data with the first record.

10. The system of claim 1, wherein the instructions further cause the system to perform:
 obtaining a set of financial reports from the at least one computing system, each financial report specifying one or more IP addresses used to access one or more financial accounts; and
 determining at least a pair of financial accounts that were accessed by the computing device with the IP address.

11. A computer-implemented method, the method comprising:
 obtaining log data from at least one computing system, the log data including one or more records that identify one or more Internet Protocol (IP) addresses of one or more computing devices that accessed the at least one computing system and one or more accounts hosted by the at least one computing system that were accessed by the computing devices and one or more timestamps indicating respective times of access of the IP addresses;
 determining, based at least in part on the obtained log data, that at least a first account was accessed from a computing device of the computing devices with an IP address of the IP addresses, and a time at which the first account was accessed based on the timestamps;
 determining whether the IP address has been permitted based on geolocation log data corresponding to the IP address or based on a type of traffic from one or more particular computing devices assigned to the IP address;
 in response to the IP address being permitted:
  receiving an indication that a second account was accessed using the IP address; and
  flagging the first account and the second account based on the respective times that the first account and the second account were accessed.

12. The computer-implemented method of claim 11, wherein the flagging further comprises:
 flagging the first account, the second account, and a third account in response to determining that the first account, the second account, and the third account were accessed by the computing device within a specified timeframe.

13. The computer-implemented method of claim 11, further comprising:
 determining at least one record in the records that corresponds to a blocked IP address; and
 removing the at least one record from the records.

14. The computer-implemented method of claim 11, further comprising:
 exporting data corresponding to the IP address to a data analysis tool for further evaluation.

15. The computer-implemented method of claim 14, further comprising:
 determining at least one object in an object model that corresponds to the IP address, the object model being managed by the data analysis tool.

16. A non-transitory computer readable medium comprising instructions that, when executed, cause one or more processors to perform:
 obtaining log data from at least one computing system, the log data including one or more records that identify one or more Internet Protocol (IP) addresses of one or more computing devices that accessed the at least one computing system and one or more accounts hosted by the at least one computing system that were accessed by the computing devices and one or more timestamps indicating respective times of access of the IP addresses;
 determining, based at least in part on the obtained log data, that at least a first account was accessed from a computing device of the computing devices with an IP address of the IP addresses, and a time at which the first account was accessed based on the timestamps;
 determining whether the IP address has been permitted based on geolocation log data corresponding to the IP address or based on a type of traffic from one or more particular computing devices assigned to the IP address;
 in response to the IP address being permitted:
  receiving an indication that a second account was accessed using the IP address;
  and flagging the first account and the second account based on the respective times that the first account and the second account were accessed.

17. The non-transitory computer readable medium of claim 16, wherein the flagging further comprises:
 flagging the first account, the second account, and a third account in response to determining that the first account, the second account, and the third account were accessed by the computing device within a specified timeframe.

18. The non-transitory computer readable medium of claim 16, wherein the instructions, when executed, further cause the processors to perform:
 determining at least one record in the set of records that corresponds to a blocked IP address; and
 removing the at least one record from the set of records.

19. The non-transitory computer readable medium of claim 16, wherein the instructions, when executed, further cause the processors to perform:
 exporting data corresponding to the IP address to a data analysis tool for further evaluation.

20. The non-transitory computer readable medium of claim 19, wherein the instructions, when executed, further cause the processors to perform:
 creating the object based on an object graph, the object graph being created by the object model and the object model being managed by the data analysis tool.

* * * * *